United States Patent
Helenius et al.

(10) Patent No.: US 10,044,201 B2
(45) Date of Patent: Aug. 7, 2018

(54) SMART SENSES FOR DIRECT CHARGING

(71) Applicant: Microsoft Technology Licensing, LLC, Redmond, WA (US)

(72) Inventors: Teemu Helenius, Riihikoski (FI); Marko Sällinen, Lempäälä (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 15/096,237

(22) Filed: Apr. 11, 2016

(65) Prior Publication Data

US 2017/0294789 A1  Oct. 12, 2017

(51) Int. Cl.
*H02J 7/04* (2006.01)
*H02J 7/16* (2006.01)
*H02J 7/00* (2006.01)

(52) U.S. Cl.
CPC ............ *H02J 7/0029* (2013.01); *H02J 7/007* (2013.01); *H02J 7/0027* (2013.01); *H02J 7/0045* (2013.01); *H02J 7/0077* (2013.01); *H02J 7/0081* (2013.01); *H02J 7/045* (2013.01); *H02J 7/0036* (2013.01); *H02J 2007/005* (2013.01); *H02J 2007/0037* (2013.01); *H02J 2007/0062* (2013.01); *H02J 2007/0096* (2013.01)

(58) Field of Classification Search
USPC ........................................................ 320/107
See application file for complete search history.

(56) References Cited

U.S. PATENT DOCUMENTS

| 7,663,346 | B2 | 2/2010 | Wang et al. | |
| 8,350,522 | B2 | 1/2013 | Johnson | |
| 8,717,044 | B2 | 5/2014 | Sims et al. | |
| 8,749,193 | B1* | 6/2014 | Sullivan | H02J 1/08 307/10.7 |
| 2008/0231233 | A1 | 9/2008 | Thornton | |
| 2009/0184687 | A1* | 7/2009 | Schroeder | H01M 10/44 320/162 |
| 2009/0189569 | A1 | 7/2009 | Hsu et al. | |
| 2012/0194141 | A1* | 8/2012 | Shi | H02M 3/157 320/137 |

(Continued)

FOREIGN PATENT DOCUMENTS

| CN | 102684245 A | 9/2012 |
| CN | 203747454 U | 7/2014 |

(Continued)

OTHER PUBLICATIONS

"International Search Report and Written Opinion Issued in PCT Application No. PCT/US2017/025812", dated Jul. 20, 2017, 15 Pages.

(Continued)

*Primary Examiner* — Bryce Aisaka

(57) ABSTRACT

In an embodiment, a device is discussed, the device comprising: a battery, a battery charging circuit configured to allow direct charging of the battery by an external charger, a battery protection circuit configured to protect the battery from damage, coupled to the battery charging circuit; and a connector comprising: at least one sense wire coupled to the battery to sense battery voltage, and at least one wire coupled to the battery via the battery charging circuit and the battery protection circuit, configured to charge the battery.

20 Claims, 5 Drawing Sheets

(56) References Cited

U.S. PATENT DOCUMENTS

2014/0312828 A1   10/2014  Vo et al.
2017/0040814 A1    2/2017  Hu et al.
2017/0126039 A1*  5/2017  Nguyen ................ H02J 7/0052

FOREIGN PATENT DOCUMENTS

| CN | 104253461 A | 12/2014 |
|----|-------------|---------|
| CN | 204067514 U | 12/2014 |
| CN | 104467077 A | 3/2015 |
| CN | 105098945 A | 11/2015 |
| EP | 2854253 A1 | 4/2015 |
| WO | 2014173262 A1 | 10/2014 |
| WO | 2015113333 A1 | 8/2015 |

OTHER PUBLICATIONS

Simpson, Chester, "Battery Charging", Published on: Dec. 2, 2012, 19 pages, Available at: http://www.ti.com/lit/an/snva557/snva557.pdf.

"INN20x3-20x5 InnoSwitch-CH Family", Published on: Nov. 2014, 24 pages, Available at: http://www.es-france.G0m/pdf/InnoSwitch-CH-Data-Sheet-NYA.pdf.

Ismail, Mohamed, "Overview of USB Battery Charging Revision 1.2 and the Important Role of Adapter Emulators", published on: Mar. 19, 2015, 7 pages, Available at: https://www.maximintegrated.com/en/app-notes/index.mvp/id/5801.

"Constant-Current/ Constant-Voltage 2A Battery Charger with Input Current Limiting", Retrieved on: Dec. 11, 2015, 16 pages, Available at: http://cds.linear.com/docs/en/datasheet/1769fa.pdf.

"Cypress: CCG1 Datasheet", Retrieved on: Dec. 11, 2015, 31 pages, Available at: http://www.cypress.com/file/140976/download.

\* cited by examiner

SMART SENSES FOR DIRECT CHARGING

BACKGROUND

Portable electronic devices need a power source to operate. Usually the power source is a battery. For ease of use and keeping the operating cost low, rechargeable batteries may be used. Rechargeable batteries may have multiple charging constraints for proper charging and maintaining a desired performance level. If these constraints are not followed during charging, the batteries may be damaged and/or cause damage to the device and even injure the user in extreme cases. Some of these constraints include maximum permissible charging voltage, target battery voltage, maximum permissible charging current, permissible battery temperature etc. These constraints may be interdependent and may necessitate charging the battery slowly over a long period of time. From a user's perspective faster charging may be desirable.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, a device is discussed, the device comprising: a battery, a battery charging circuit configured to allow direct charging of the battery by an external charger, a battery protection circuit configured to protect the battery from damage, coupled to the battery charging circuit; and a connector comprising: at least one sense wire coupled to the battery to sense battery voltage, and at least one wire coupled to the battery via the battery charging circuit and the battery protection circuit, configured to charge the battery.

In another embodiment, a device is discussed, the device comprising a direct current power supply, a feed-back circuit, a connector comprising: at least one voltage sense pin coupled to the power supply via the feedback circuit, configured to receive a sensed voltage of a battery to be charged, and at least one pin coupled to the power supply, configured to carry a charging current for direct charging the battery wherein the charging parameters are adjusted based on the sensed battery voltage on the sense pin.

In an embodiment a method is discussed.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the present disclosure may be constructed or utilized. However, the same or equivalent functions and structures may be accomplished by different embodiments.

Although the embodiments may be described and illustrated herein as being implemented in a smartphone and a wall charger, this is only an example implementation and not a limitation. As those skilled in the art will appreciate, the present embodiments are suitable for application in a variety of different types of rechargeable battery operated devices, for example, laptops, tablet computers, phablets, mobile phones, cordless phones, portable media players, portable gaming consoles, portable barcode readers, portable point of sale devices etc. and charging devices comprising a direct current power source, for example a power bank, a device docking station etc.

According to an embodiment, a battery may be charged by bypassing the on device charging control circuit, for example, by using a low resistance switch. In addition to voltage and ground lines configured to connect to the battery through a protection circuit, two battery voltage sense lines may also be configured to be connected to the battery to sense the battery voltage continuously. The voltage, ground and sense lines may be connected to a wall charger which may adjust its output voltage and output current according to a sensed battery voltage. According to an embodiment, when a battery is being charged in a constant current mode, some of the charging may be used to drive a system load of the device. When, and if the system load drops, all the charging current may be fed to the battery raising its voltage. The charger may receive the sensed battery voltage immediately and adjust the output voltage and output current suitably. This may prevent the battery voltage from rising above a battery voltage maximum threshold, preventing damage to the battery and improving its lifetime, capacity and or performance. According to an embodiment, safe and fast direct charging may be achieved. According to an embodiment, Side band use, SBU, pins/lines of a Universal serial bus USB Type C connector may be configured as sense lines whereas its Vbus and GND pins/lines may be used for delivering charge. According to an embodiment, configuration of SBU pins and lines for battery voltage sensing may not preclude the SBU pins/lines from being used for other purposes. According to an embodiment, charging device may be able to respond to an increase in battery voltage faster than for example, by using relatively time consuming protocols like polling the battery to know the voltage across its terminals.

Figure 1:
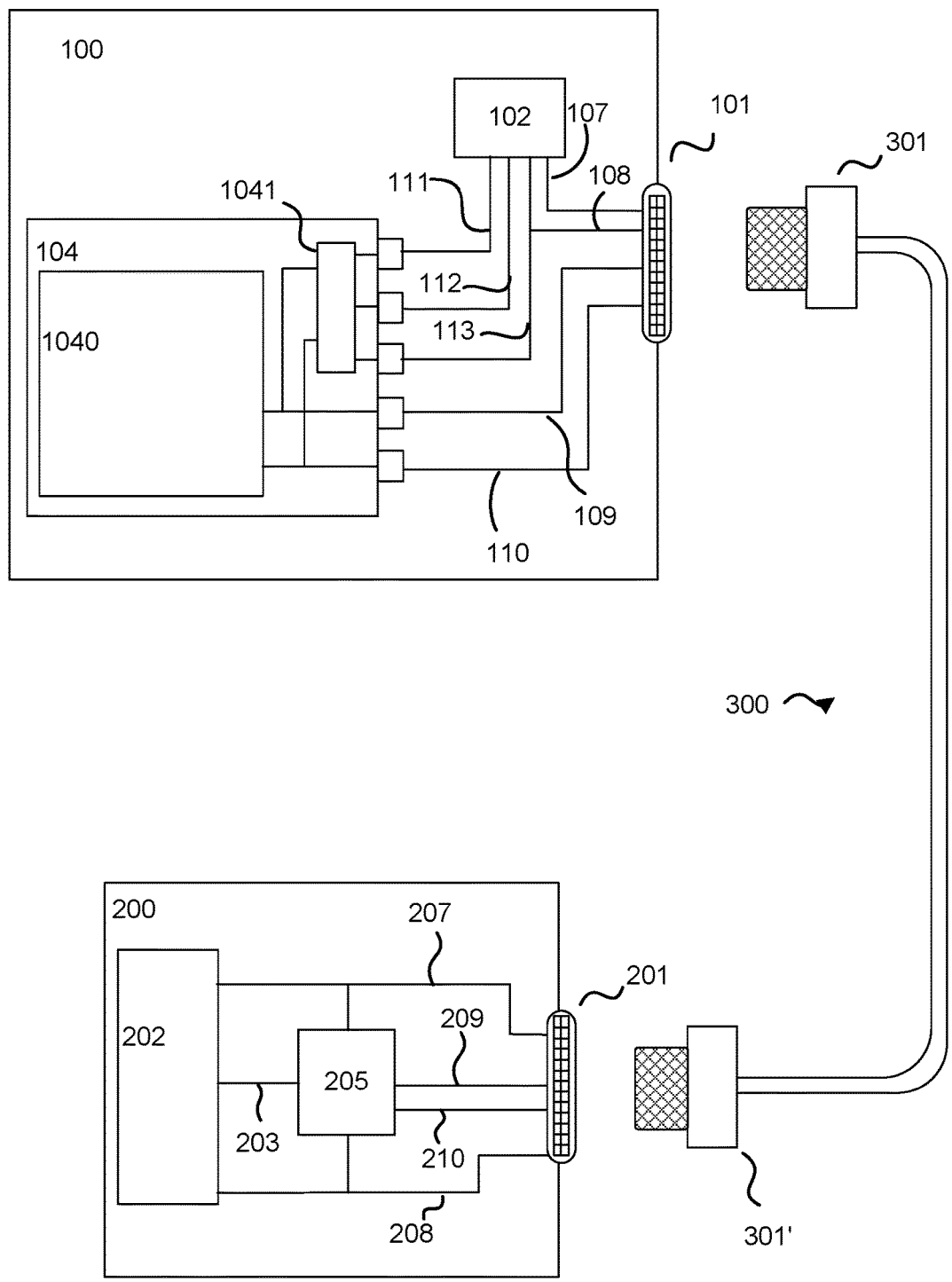
FIG. 1 illustrates a schematic representation of a charger and a device comprising a battery connected by a cable, according to an embodiment.

FIG. 1 illustrates a device 100, a charger 200 connected via a connecting cable 300, according to an embodiment. The device 100 comprises a battery 104, a connector 101 and a battery charging integrated circuit 102, which may hereinafter be referred as charging IC, battery charger IC, battery charging IC, or a battery charging chip interchangeably. The battery charging IC may be configured to charge a battery according to some charging algorithms. It may, however, have the ability to relinquish charging control to a charger after a direct charging charger is detected. Battery 104 may comprise protection circuitry 1041 and at least one rechargeable cell 1040. Connector 101 may comprise wires, for example pins corresponding to the charging line—Voltage bus, Vbus 107, ground line GND 108, and two sense lines 109 and 110. According to an embodiment, the connector 101 may be a USB Type C connector. According to an embodiment, connector 101 may be a custom charging connector. From the connector 101, Vbus line 107 may connect to the charging IC 102, GND line 108 may directly connect to a GND line 113 coming out of charging IC 102. Sense lines 109 and 110 may directly connect to terminals of battery 104 or cell 1040 to sense the battery voltage. From the battery charging IC 102, VBAT 111 and GND 113 may connect to the cell terminals via protection circuit 1041, wherein VBAT 111 is the line carrying voltage to battery 104. Other lines, like ID line 112 may also be connected between the battery charging circuit 102 and the battery protection circuit 1041. For direct charging, Vbus 107 from connector may be directly connected to VBAT 111 of the charging IC, for example, via a low resistance switch. According to an embodiment, the low resistance switch may be closed after the charging IC detects a compatible direct charger 200. This may be accomplished by negotiations between device 100 and charger 200 or by a hardware ID or by a combination of both. According to an embodiment, if compatibility is not established, an alternative mode of charging may be used. Alternative modes of charging may include conventional indirect charging, direct charging without sense lines, software controlled direct charging, etc.

Wall charger 200 comprises a connector 201, a feedback circuit 205 and an alternating current, AC to direct current, DC converter 202 which supplies direct current DC for charging a battery. The AC-DC converter 202 may be able to supply current and voltage at specified values depending upon mode of charging. The connector 201 may comprise pins corresponding to charging line—Voltage bus Vbus 207, ground GND 208 and two sense lines 209, 210. Vbus line 207 may connect the Vbus pin to the AC-DC converter 202, GND line 208 may connect the GND pin to the AC-DC converter 202. Sense lines 209 and 210 may connect the sense lines to the feedback circuit 205. Feedback circuit 205 may be connected to the Vbus line 207, the GND line 208 and the AC-DC converter circuit 202. Further feedback circuit 205 may be connected to the AC-DC converter circuit 202 via a line 203. Line 203 may carry control signals to adjust output of AC-DC converter 202 from feedback circuit 205 based on sensed voltage on sense lines 209 and 210. According to an embodiment, feedback circuit 205 may be wholly or partially contained within the AC-DC converter circuit 202. The connecting cable may comprise lines corresponding to Vbus, GND, and lines for sensing (not shown). At its ends it may comprise connectors 301 and 301' configured to connect to connector 101 and 201 respectively. According to an embodiment, the connectors 301 and 301' may be interchangeable or orientation agnostic or both interchangeable and orientation agnostic. According to an embodiment, connector 301' may be configured to be permanently connected to connector 201. According to an embodiment, connectors 201 and 301' may be replaced by direct electric connections between lines 207, 208, 209, 210 in wall charger 200 and lines in connecting cable 300. Although the present embodiments may be illustrated as being implemented using an AC-DC converter 202, it is for illustrative purposes only and not a limitation. According to an embodiment, AC-DC converter 202 may be replaced by a DC-DC converter (not shown).

Referring to FIG. 1, when device 100 is connected to wall charger 200 via the connecting cable, device 100 may determine whether wall charger 200 supports direct charging as specified herein. This may be accomplished, for example, by negotiations between the device 100 and charger 200. According to an embodiment, connectors 101, 201, 301, 301' and connecting cable 300 may be USB type C compliant and the negotiation may take place over a USB or USB based connection, for example Alternate Mode as described in USB Power Delivery, USB PD specifications. According to an embodiment, the device 100 may determine that the wall charger 200 supports direct charging as specified herein by detecting an analog signal or a special pin in connector 301. If direct charging as disclosed herein is supported, the charging IC 102 may close a low resistance switch between Vbus line 107 from the connector 101 to VBAT line 111 to the battery, allowing a direct charging path from the charger 200 to the battery 104. The sense lines 209, 210 and 109, 110 may also form a direct sensing path from the wall charger 200 to the battery 104 and/or cell 1040 via the cable 300. When the battery 104 and/or cell 1040 voltage is below a battery voltage target threshold, the AC-DC converter 202 may supply a constant current to the battery 104 for charging it. A portion of the current so supplied may be used to drive the system load. System load may include driving processors, or other integrated circuits, speakers, displays, sensors etc. (not shown in FIG. 1) in device 100. At times the system load may drop and the portion of current driving the system load may be directed towards the battery, causing the battery voltage to rise. The feedback circuit 205 may detect the rise in battery voltage over sense lines and cause the AC-DC converter to output a lower current and/or charging voltage, so that battery voltage does not overshoot a battery voltage maximum threshold and quickly drops to a battery voltage target threshold. According to an embodiment, when the feedback circuit senses a rise in battery voltage towards the battery voltage target threshold or battery voltage maximum threshold, the charging is changed to a constant voltage mode. According to an embodiment, battery voltage maximum threshold and battery voltage target threshold may be based on battery 104 characteristics. According to an embodiment, battery voltage maximum threshold may be the maximum battery voltage which does not affect the battery 104 or the device 100 adversely. According to an embodiment, battery voltage target threshold may be a voltage at which the battery 104 operates and/or charges optimally. According to an embodiment, factors affecting the battery 104 and device 100 may also be considered while defining the battery voltage target threshold and battery voltage maximum threshold.

According to an embodiment, battery 104 may be charged safely and quickly. According to an embodiment, voltage drop across the connecting cable 300 and other components between the AC-DC converter 202 and battery 104 and/or cell 1040 may be compensated. According to an embodiment, life and capacity of battery 104 may be improved by preventing battery voltage from rising above the battery voltage maximum threshold. According to an embodiment, response of AC-DC converter 202 to change in battery voltage due to sensing by sense lines may be faster than, for example, a scenario where charging control is software based.

Figure 2:
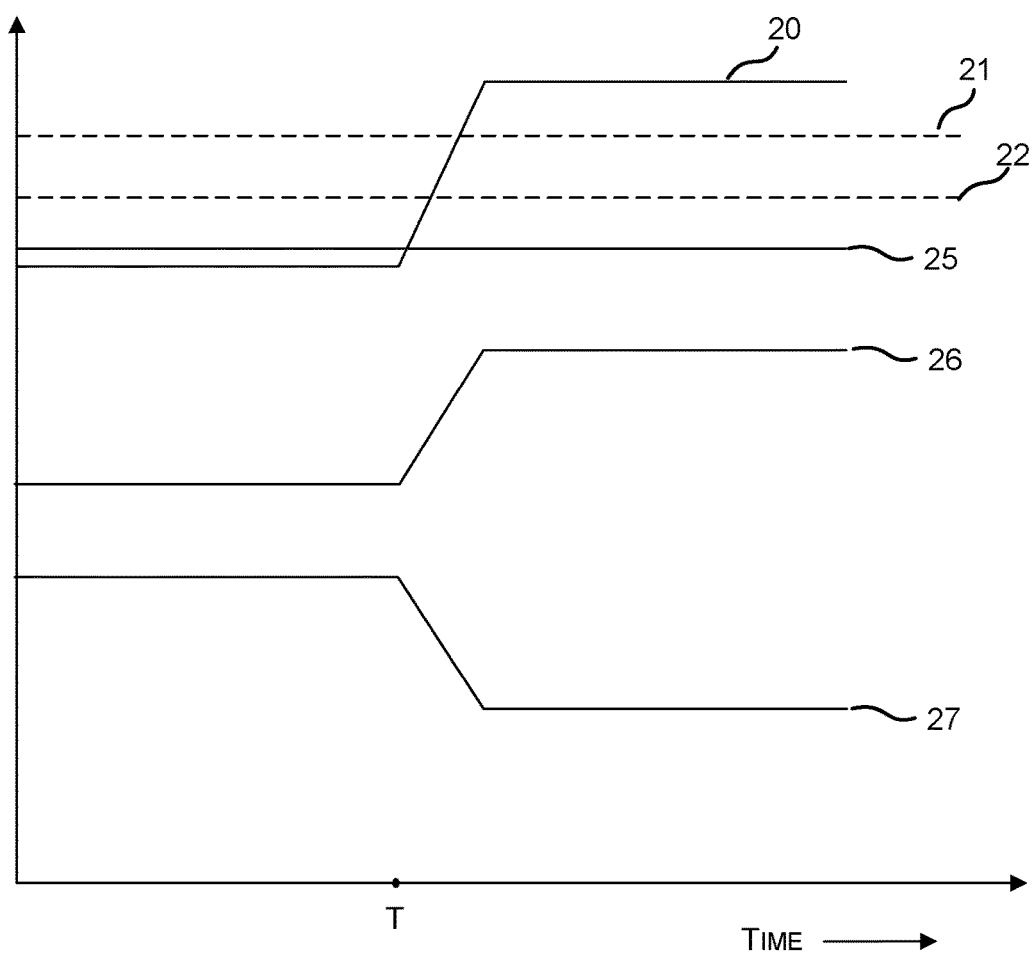
FIG. 2 illustrates a graphical representation of various currents and voltages involved when sense lines are not used.
Figure 3:
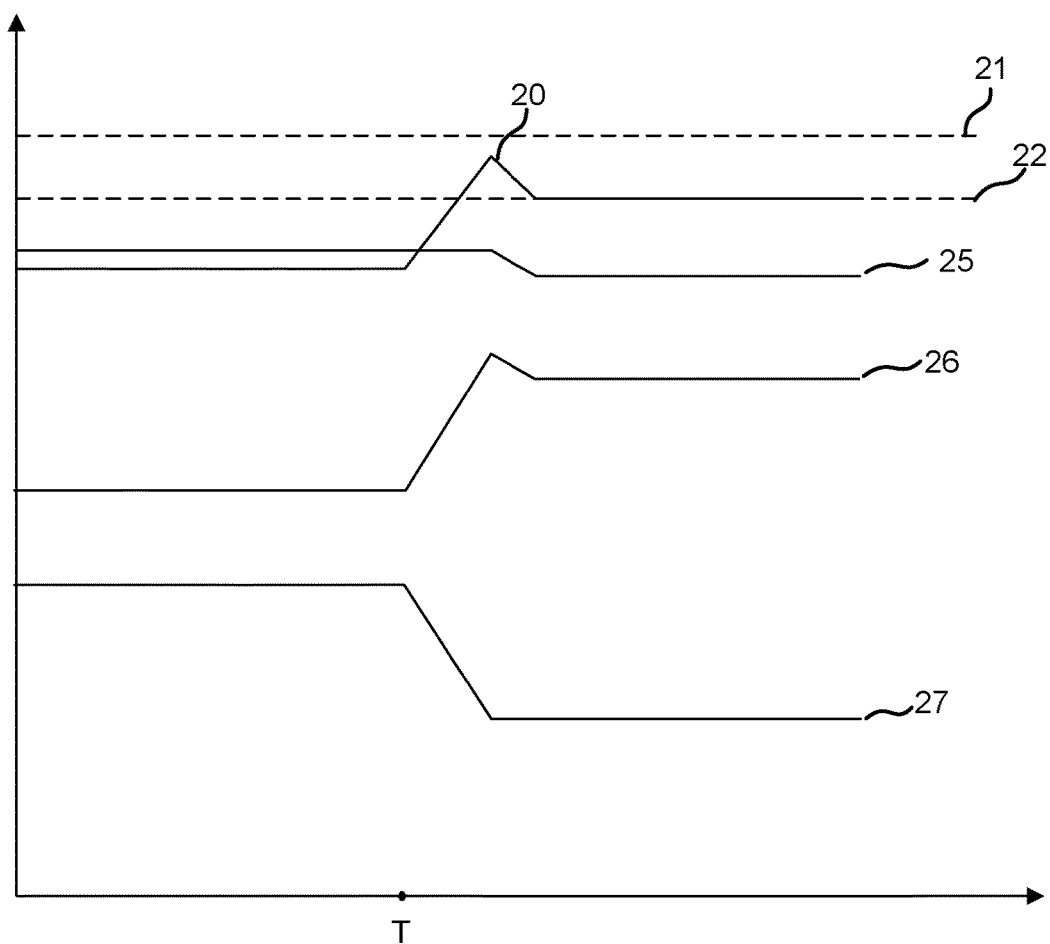
FIG. 3 illustrates a graphical representation of various currents and voltages involved when sense lines are used, according to an embodiment.

FIG. 2 and FIG. 3 respectively illustrate direct charging without and with sense lines 109, 110 and 209, 210 being connected from the battery 104 to the wall charger 200, in a graphical form, according to an embodiment. Referring to FIG. 2 and FIG. 3, battery voltage 20, battery voltage maximum threshold 21, battery voltage target threshold 22, charger current 25, battery current 26 and system current consumption 27 are exemplarily plotted with respect to time.

Referring to FIG. 2, initially the battery 104 may be charged in a constant current mode, the charger current 25 being constant. Some of the charger current 25 may be utilized to drive the system load. This current is represented by the system current consumption line 27. The rest of the current supplied by the charger, may charge the battery 104 and is represented by battery current 26. Initially the system load current 27 and battery current 26 may be constant hence the battery voltage 20 may be steady and below the battery voltage target threshold 22, and the battery voltage maximum threshold 21. At an exemplary point T in time, the system usage and hence the system current consumption 27 may drop. Since the charger current is constant, all the current may be directed to the battery causing the battery current 26 and hence the battery voltage 20 to rise. If the change in battery current is substantial, the battery voltage 20 may rise above the battery voltage maximum threshold 21, damaging the battery 104 and possibly the device 100. In some cases, this may cause battery overheating, expansion, decrease in battery performance, decrease in usable battery lifetime, or other undesired effects.

FIG. 3 represents the same system current consumption scenario as illustrated in FIG. 2, but illustrates the effect of using sense lines 109, 110, 209, 210 for direct charging according to an embodiment. When the battery voltage begins to rise at time T, the battery voltage rise may be sensed by feedback unit 205 via the sense lines and current and/or voltage output of 202 may be promptly reduced. This may prevent the battery voltage 20 from rising above the battery voltage maximum threshold 21. The battery voltage 20 may be quickly brought down to a battery voltage target threshold 22 by adjusting the output current of the charger 200.

Figure 4:
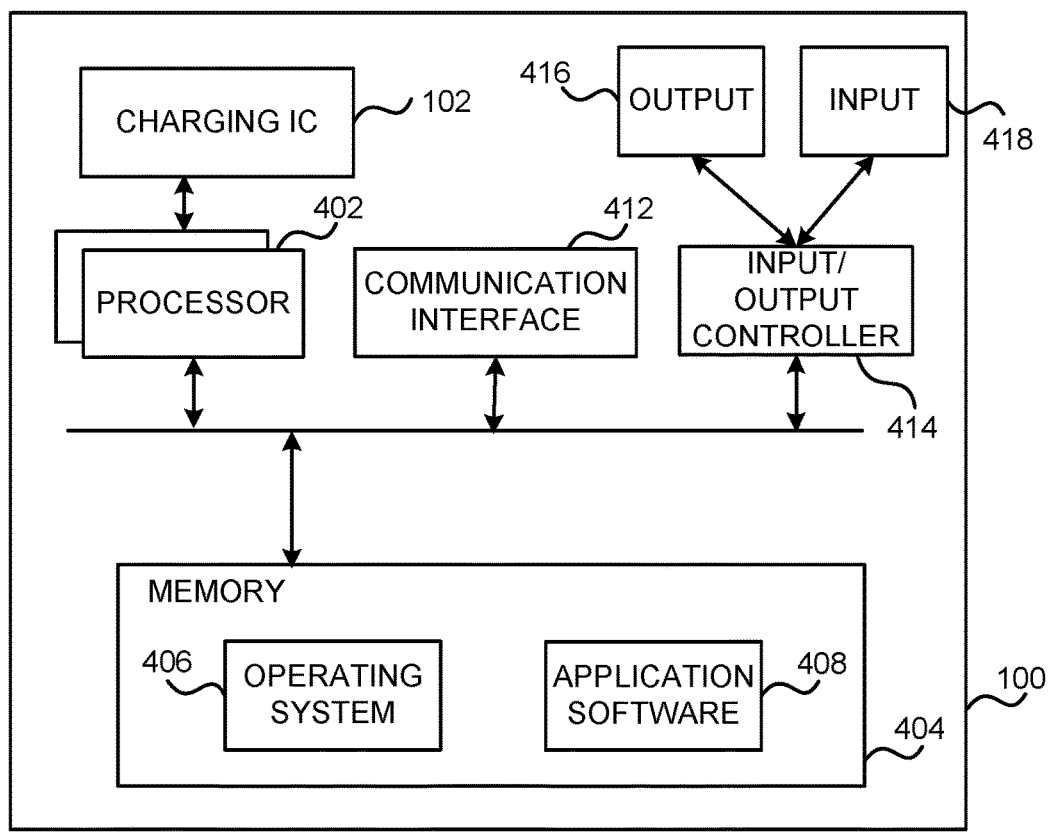
FIG. 4 illustrates a computing device configured for direct charging, according to an embodiment.

FIG. 4 illustrates an example of components of a device 100 which may be implemented as a form of a computing and/or electronic device. The computing device 100 comprises one or more processors 402 which may be microprocessors, controllers or any other suitable type of processors for processing computer executable instructions to control the operation of the apparatus 100. Platform software comprising an operating system 406 or any other suitable platform software may be provided on the apparatus to enable application software 408 to be executed on the device. There may be a separate charging IC 102 or the charging IC may be integral to processor 402. A discrete charging IC 102 may contain logic to detect and/or negotiate direct charging capabilities. According to an embodiment, the discrete charging IC, if present, may be controlled by processor 402.

Computer executable instructions may be provided using any computer-readable media that are accessible by the device 100. Computer-readable media may include, for example, computer storage media such as a memory 404 and communications media. Computer storage media, such as a memory 404, include volatile and non-volatile, removable and non-removable media implemented in any method or technology for storage of information such as computer readable instructions, data structures, program modules. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, in a modulated data signal, such as a carrier wave, or other transport mechanism. Although the computer storage medium (the memory 404) is shown within the device 100, it will be appreciated, by a person skilled in the art, that the storage may be distributed or located remotely and accessed via a network or other communication link (e.g. using a communication interface 412).

The device 100 may comprise an input/output controller 414 arranged to output information to an output device 416 which may be separate from or integral to the device 100. The input/output controller 414 may also be arranged to receive and process an input from one or more input devices 418. In one embodiment, the output device 416 may also act as the input device. The input/output controller 414 may also output data to devices other than the output device, e.g. a locally connected printing device. According to an embodiment, the negotiation and/or detection of direct charging capabilities of a charger 200 in device 100 for example as shown in FIG. 1, may be established with the features of FIG. 4, for example the operating system 406 and the application software 408 working jointly, and executed by the processor 402.

The functionality described herein, for example, detection and/or negotiation of direct charging, can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 5:
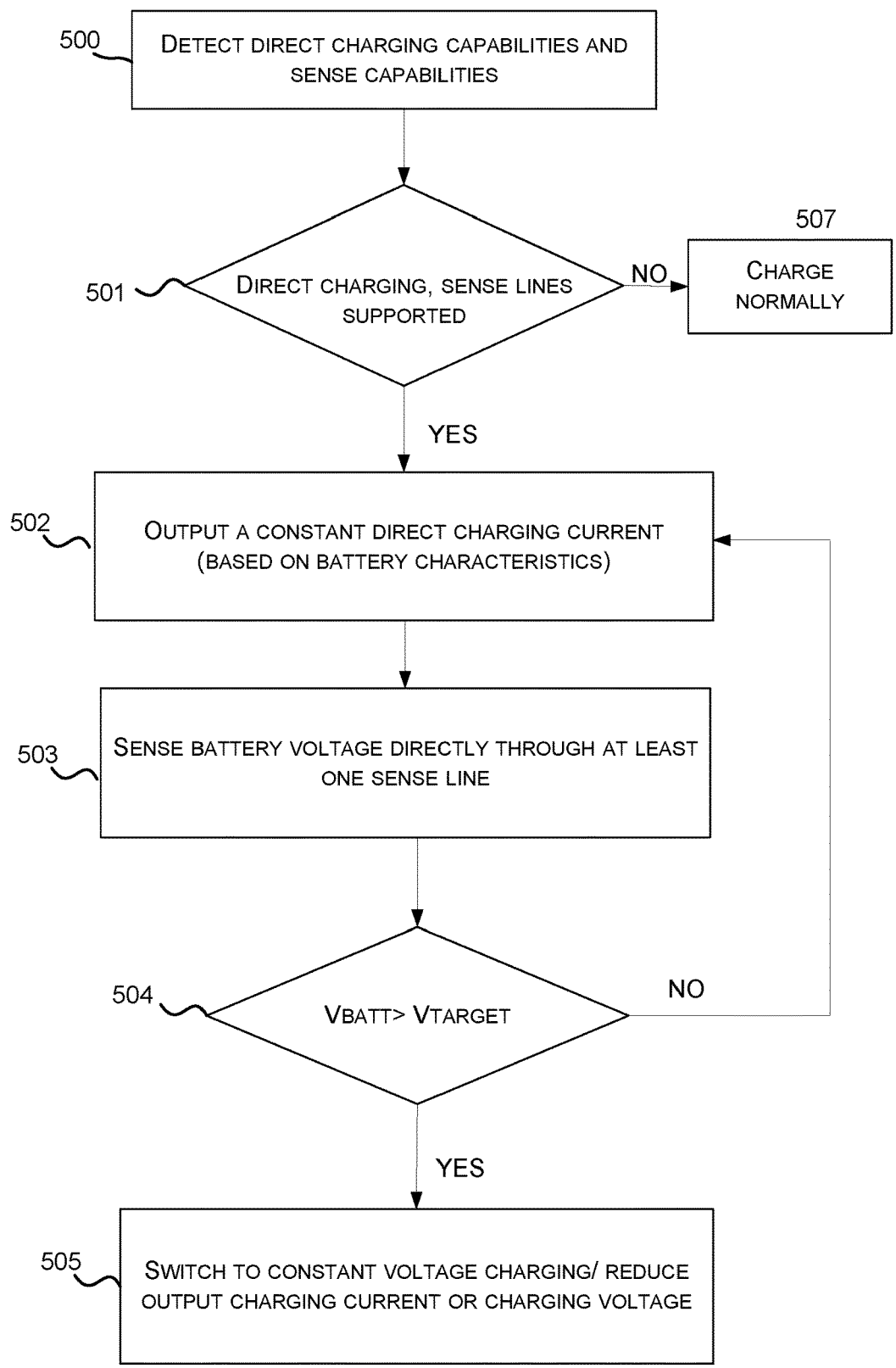
FIG. 5 illustrates a schematic flow chart of a method of charging a battery in accordance with an embodiment.

FIG. 5 illustrates, as a schematic flow chart, a method of direct charging in accordance with an embodiment. Referring to FIG. 5, according to an embodiment the process comprises operations 500, 501, 502, 503, 504 and 505. According to an embodiment, at least operation 500 of the process of FIG. 5 may be compiled into the program code 406,408.

Operation 500 may include detecting and/or negotiating direct charging capabilities between the device 100 which has a battery to be charged and the charging device 200. The detection and/or negotiation operation may also include detecting direct sense lines 109, 110, 209, 210. Operation 500 may further include exchange charging parameters and battery 104 characteristics.

Operation 501 may include deciding whether to employ direct charging or not based on information from operation 500. If direct charging and sense lines 109, 110, 209, 210 are supported, operation 502 may be performed. Otherwise, operation 507 may be performed which may include conventional charging methods both direct and indirect.

Operation 502 may include outputting a constant direct current for direct charging the battery 104. The output current and charging voltage levels may be based on battery characteristics.

Operation 503 may include sensing the battery voltage, Vbatt, via sense lines from a battery 104.

Operation 504 may include comparing the sensed battery voltage, Vbatt to a battery voltage target threshold, Vtarget. If the sensed battery voltage, Vbatt is greater than battery voltage target threshold, Vtarget, operation 505 may be performed, if not, the method may continue from operation 502.

Operation 505 may include adjusting the output charging current and/or voltage so that Vbatt becomes less than or equal to Vtarget. According to an embodiment, this may also include switching to a constant voltage mode of charging.

According to an embodiment, operations 503, 504 and 505 may be carried out fast enough to preclude the battery voltage from exceeding a battery voltage maximum threshold.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions. Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The embodiments illustrated and described herein as well as embodiments not specifically described herein but within the scope of aspects of the disclosure constitute exemplary means for delivering charge to a battery from a charger, exemplary means for directly sensing voltage of a battery from a charging device, exemplary means for providing a charging voltage and a charging current, exemplary means for connectors, exemplary means for providing an electrical and/or data connection between the two connectors and exemplary means for feed-back circuits. For example, the elements illustrated in FIG. 1 constitute exemplary means for delivering charge to a battery from a charger, exemplary means for sensing voltage of a battery, exemplary means for providing a charging voltage and a charging current, exemplary means for connectors, exemplary means for providing an electrical and/or data connection between the two connectors and exemplary means for feed-back circuits According to an embodiment, a device, comprising: a battery; a battery charging circuit configured to allow direct charging of the battery by an external charging device; a battery protection circuit configured to protect the battery from electrical damage, coupled to the battery charging circuit; and a connector comprising: at least one sense wire coupled to the battery to sense battery voltage; and at least one wire coupled to the battery via the battery charging circuit and the battery protection circuit, configured to charge the battery.

Alternatively or in addition to the above, further comprising a low resistance switch for direct charging the battery, wherein the switch is controlled by the battery charging circuit. Alternatively or in addition to the above, the connector further comprises wires for data communication. Alternatively or in addition to the above, charging capabilities are negotiated between the device and the external charging device before charging commences. Alternatively or in addition to the above, if the at least one sense wire is not connected to the external charging device, an alternative mode of charging is selected. Alternatively or in addition to the above, the alternative mode of charging comprises direct charging without direct sense wires. Alternatively or in addition to the above, the connector comprises a Universal Serial Bus, USB Type-C connector. Alternatively or in addition to the above, the Sideband Use, SBU pins are configured to sense the battery voltage. Alternatively or in addition to the above, the Voltage Bus pin, Vbus and Ground pin, GND, are configured to charge the battery.

According to an embodiment, a device comprising: a power supply; a feedback circuit; a connector comprising: at least one sense pin coupled to the power supply via the feedback circuit, configured to receive a sensed voltage of a battery to be charged; and at least one pin coupled to the power supply, configured to carry a charging current for direct charging the battery; wherein the charging parameters are adjusted based on the sensed battery voltage on the sense pin.

Alternatively or in addition to the above, the connector further comprises pins for data communication. Alternatively or in addition to the above, further comprising logic circuits and/or a microprocessor capable of negotiating direct charging capabilities and parameters with a device to be charged. Alternatively or in addition to the above, the charging mode is changed from a constant current mode to a constant voltage mode if the sensed voltage is above a battery voltage target threshold. Alternatively or in addition to the above, the charging current is reduced if the sensed battery voltage rises above a predefined battery voltage target threshold. Alternatively or in addition to the above, the reduction in the charging current is such that the battery voltage is precluded from exceeding a predefined battery voltage maximum threshold and drops to a battery voltage target threshold. Alternatively or in addition to the above, the connector is a Universal Serial Bus, USB Type-C connector and the Voltage Bus pin, Vbus and Ground pin, GND of the connector are configured for direct charging a battery. Alternatively or in addition to the above, the Sideband Use SBU pins of the connector are configured as the sense pins. Alternatively or in addition to the above, the feedback circuit comprises wholly or partially integral to the power supply.

According to an embodiment, a method, comprising: outputting a constant current for direct charging a battery; sensing a battery voltage by sense lines from a battery; and reducing a charging current if the sensed battery voltage is greater than a battery voltage target threshold, the reduction being such that the battery voltage is precluded from exceeding a predefined battery voltage maximum threshold.

Alternatively or in addition to the above, before commencement of direct charging, direct charging capabilities and/or parameters are negotiated with the device to be charged.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a battery charging circuit configured to allow direct charging of a battery by an external charging device;
a battery protection circuit configured to protect the battery from electrical damage, coupled to the battery charging circuit; and
a connector comprising:
at least one sense wire coupled to the battery to sense battery voltage; and
at least one wire coupled to the battery via the battery charging circuit and the battery protection circuit, configured to charge the battery, and
wherein the connector comprises a Universal Serial Bus (USB) Type-C connector, and wherein Sideband Use (SBU) pins are configured to sense battery voltage.

2. The device of claim 1, further comprising a low resistance switch for direct charging the battery, wherein the switch is controlled by the battery charging circuit.

3. The device of claim 1, wherein the connector further comprises wires for data communication.

4. The device of claim 1, wherein charging capabilities are negotiated between the device and the external charging device before charging commences.

5. The device of claim 1, wherein if the at least one sense wire is not connected to the external charging device, an alternative mode of charging is selected.

6. The device of claim 5, wherein the alternative mode of charging comprises direct charging without direct sense wires.

7. The device of claim 1, wherein the Voltage Bus (Vbus) pin, and Ground (GND) pin, are configured to charge the battery.

8. A device comprising:
a feedback circuit;
a connector comprising:
at least one sense pin coupled to a power supply via the feedback circuit, configured to receive a sensed voltage of a battery to be charged; and
at least one pin coupled to the power supply, configured to carry a charging current for direct charging the battery;
wherein the charging parameters are adjusted based on the sensed voltage of the battery on the sense pin, and
wherein the connector comprises a Universal Serial Bus (USB) Type-C connector, and wherein Sideband Use (SBU) pins are configured to sense battery voltage.

9. The device of claim 8, wherein the connector further comprises pins for data communication.

10. The device of claim 8, further comprising logic circuits and/or a microprocessor capable of negotiating direct charging capabilities and parameters with a device to be charged.

11. The device of claim 8, wherein the charging mode is changed from a constant current mode to a constant voltage mode if the sensed voltage is above a battery voltage target threshold.

12. The device of claim 8, wherein the charging current is reduced if the sensed battery voltage rises above a predefined battery voltage target threshold.

13. The device of claim 12, wherein the reduction in the charging current is such that the battery voltage is precluded from exceeding a predefined battery voltage maximum threshold and drops to a battery voltage target threshold.

14. The device of claim 8, wherein the Voltage Bus (Vbus) pin, and Ground (GND) pin, of the connector are configured for direct charging the battery.

15. The device of claim 8, wherein the feedback circuit comprises wholly or partially integral to the power supply.

16. A method, comprising:
outputting, via a connector, a constant current for direct charging a battery;
sensing, via a connector, a battery voltage by sense lines from the battery; and
reducing a charging current if the sensed battery voltage is greater than a battery voltage target threshold, the reduction being such that the battery voltage is precluded from exceeding a predefined battery voltage maximum threshold, and
wherein the connector comprises a Universal Serial Bus (USB) Type-C connector, and wherein Sideband Use (SBU) pins are configured to sense the battery voltage.

17. The method of claim 16, wherein before commencement of direct charging, direct charging capabilities and/or parameters are negotiated with the device to be charged.

18. The method of claim 16, further comprising direct charging the battery via a low resistance switch, wherein the switch is controlled by the battery charging circuit.

19. The method of claim 16, wherein the connector further comprises wires for data communication.

20. The method of claim 16, wherein charging capabilities are negotiated before charging commences.

\* \* \* \* \*